United States Patent
Grosspietsch et al.

(10) Patent No.: US 6,584,869 B2
(45) Date of Patent: Jul. 1, 2003

(54) BALL SCREW

(75) Inventors: Wolfgang Grosspietsch, Schweinfurt (DE); Angelika Ebert, Schweinfurt (DE); Markus Heiartz, Schweinfurt (DE); Wolfgang Reisser, Sennfeld (DE); Andreas Dau, Würzburg (DE); Paul Kraus, Niederwerrn (DE); Thomas John, Sulzheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 7 days.

(21) Appl. No.: 09/908,394

(22) Filed: Jul. 18, 2001

(65) Prior Publication Data

US 2002/0040614 A1 Apr. 11, 2002

(30) Foreign Application Priority Data

Jul. 21, 2000 (DE) .......................... 100 35 515

(51) Int. Cl.⁷ .............................. F16H 25/22
(52) U.S. Cl. .................................. 74/424.75
(58) Field of Search ................ 74/424.75, 81, 74/82, 88

(56) References Cited

U.S. PATENT DOCUMENTS

| | | | | |
|---|---|---|---|---|
| 477,642 A | * | 6/1892 | Brunthaver | 74/424.75 |
| 2,502,066 A | * | 3/1950 | Tanner | 74/424.75 |
| 2,855,791 A | * | 10/1958 | Hogan | 74/424.75 |
| 3,667,311 A | * | 6/1972 | Wysong | 74/424.75 |
| 4,070,921 A | * | 1/1978 | Arnold | 74/424.75 |
| 4,080,011 A | * | 3/1978 | Wilke et al. | 74/424.75 |
| 4,198,872 A | * | 4/1980 | Metz | 74/424.75 |
| 4,612,817 A | * | 9/1986 | Neff | 74/424.75 |
| 4,680,982 A | * | 7/1987 | Wilke et al. | 74/424.75 |
| 5,022,277 A | * | 6/1991 | Shaffer | 74/424.9 |
| 5,239,882 A | * | 8/1993 | Druet | 74/424.75 |
| 5,749,265 A | * | 5/1998 | Namimatsu et al. | 74/424.75 |
| 5,809,837 A | * | 9/1998 | Shaffer | 74/424.92 |

\* cited by examiner

*Primary Examiner*—David A. Bucci
*Assistant Examiner*—Bradley J. Van Pelt
(74) *Attorney, Agent, or Firm*—Cohen, Pontani, Lieberman & Pavane

(57) ABSTRACT

A ball screw includes a spindle element which has a first groove arrangement on an outer circumferential surface, a nut element which surrounds the spindle element and has a second groove arrangement on an inner circumferential surface, and a plurality of balls, at least some of which engage into the first groove arrangement and the second groove arrangement. The nut element is rotatable about an axis of rotation with respect to the spindle element, and, during the rotation of the nut element about the axis of rotation with respect to the spindle element, the balls which engage into the first groove arrangement and the second groove arrangement roll in the first and the second groove arrangement, while at the same time rotate about respective ball axes of rotation. In this case, there is provision, with respect to the ball axis of rotation, for an effective ball rolling radius with which the balls roll in the first groove arrangement to be smaller than the effective ball rolling radius with which the balls roll in the second groove arrangement.

7 Claims, 2 Drawing Sheets

BALL SCREW

BACKGROUND OF THE INVENTION

1. Field of the Invention

The present invention relates to a ball screw, comprising a spindle element which has a first groove arrangement on an outer circumferential surface, a nut element which surrounds the spindle element and has a second groove arrangement on an inner circumferential surface, and a plurality of balls, at least some of which engage into the first groove arrangement and the second grove arrangement, the nut element being rotatable about an axis of rotation with respect to the spindle element, and, during the rotation of the nut element about the axis of rotation with respect to the spindle element, the balls which engage into the first groove arrangement and the second groove arrangement rolling in the first and the second groove arrangement, while at the same time rotating about respective ball axes of rotation.

2. Description of the Related Art

Ball screws of this type are employed in many areas of use in which a rotational movement is to be converted into a rectilinear displacement movement. For example, movement conversion arrangements of this type are employed in automatically controlled machine tools, and use as a clutch disengager may also be envisaged.

A basic requirement of ball screws of this type, which ultimately serve for converting a rotational movement into a displacement movement, is that, during the conversion of movement, as little energy as possible is dissipated as frictional energy or the like and therefore, after conversion, is no longer available on the output side. There is a problem, here, in that the various ball elements come to bear or roll on regions of the spindle element and of the nut element which have a different radius with respect to the axis of rotation. For example, in terms of a single revolution of a respective ball about the ball axis of rotation, this means that, in this case, the ball would have to cover a greater distance along the bearing region on the second groove arrangement than on the corresponding surface of the first groove arrangement. This necessitates a partially slipping movement of the balls in the bearing region in at least one of the groove arrangements and consequently the introduction of a sliding movement with a corresponding loss due to sliding friction.

SUMMARY OF THE INVENTION

The object of the present invention is to provide a ball screw in which the conversion of movement into rotational movement into displacement movement takes place with a reduced energy loss.

This object is achieved, according to the invention, by means of a ball screw, comprising a spindle element which has a first groove arrangement on an outer circumferential surface, a nut element which surrounds the spindle element and has a second groove arrangement on an inner circumferential surface, and a plurality of balls, at least some of which engage into the first groove arrangement and the second groove arrangement, the nut element being rotatable about an axis of rotation with respect to the spindle element, and, during the rotation of the nut element about the axis of rotation with respect to the spindle element, the balls which engage into the first groove arrangement and the second groove arrangement rolling in the first and second groove arrangement, while at the same time rotating about respective ball axes of rotation.

There is also provision, at the same time, with respect to the ball axis of rotation, for an effective ball rolling radius with which the balls roll in the first groove arrangement to be smaller than an effective ball rolling radius with which the balls roll in the second groove arrangement.

The provision of different effective ball rolling radii in the region of interaction with the various groove arrangements ensures that a larger effective ball rolling radius is provided at that groove arrangement at which, because of its greater radial distance from the axis of rotation, a ball element has to cover a greater distance during the rolling movement, so that, for example, again in terms of a single ball revolution about the respective ball axis of rotation, this compensates for the fact that a longer rolling distance has to be covered on the nut element located radially further outward. In spite of an identical rotational speed of the balls about the respective ball axes of rotation, therefore, a different rolling distance can be provided on the various bearing regions during a revolution of the balls.

For example, the configuration of the ball screw according to the invention may be such that the balls can roll on a first rolling-surface region of the first groove arrangement and a second rolling-surface region of the second groove arrangement, while at the same time rotating about the respective ball axis of rotation, and that, at least during the rolling movement, the balls are in contact via the first rolling-surface region with a first ball-surface region which is at a shorter distance from the ball axis of rotation than a second ball-surface region with which, at least during the rolling movement, the balls are in contact with the second rolling-surface region. This may be achieved, for example, in that the first groove arrangement has a groove cross-sectional profile with a first surface radius of curvature in the region of the first rolling-surface region, in that the second groove arrangement has a groove cross-sectional profile with a second surface radius of curvature in the region of the second rolling-surface region, and in that the first surface radius of curvature is smaller than the second surface radius of curvature. In order to obtain defined interaction between the balls and the groove arrangements and, in particular, also to make it possible for the ball to be inserted easily into the groove arrangements, it is proposed that the first groove arrangement and the second groove arrangement have a respective groove cross-sectional profile with a surface radius of curvature decreasing from a groove-aperture region toward a groove bottom.

If there is provision for the surface radius of curvature of the first groove arrangement and/or of the second groove arrangement to be smaller in the region of the groove bottom than the radius of the balls, this ensures that the balls cannot come into contact with the groove bottom. There is thus produced between the widest ball regions located in the groove arrangements and the groove bottom an interspace, in which bearing contact cannot occur and which may therefore, in particular, also serve for the reception of impurities.

The ball screw according to the invention may be designed, for example, in such a way that the first groove arrangement has at least one thread flight, preferably with a plurality of turns, and that the second groove arrangement has, assigned to each thread flight of the first groove arrangement, at least one second thread flight, the at least one second thread flight preferably having at least one turn, the turn end regions of which are connected to one another via a ball return portion.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
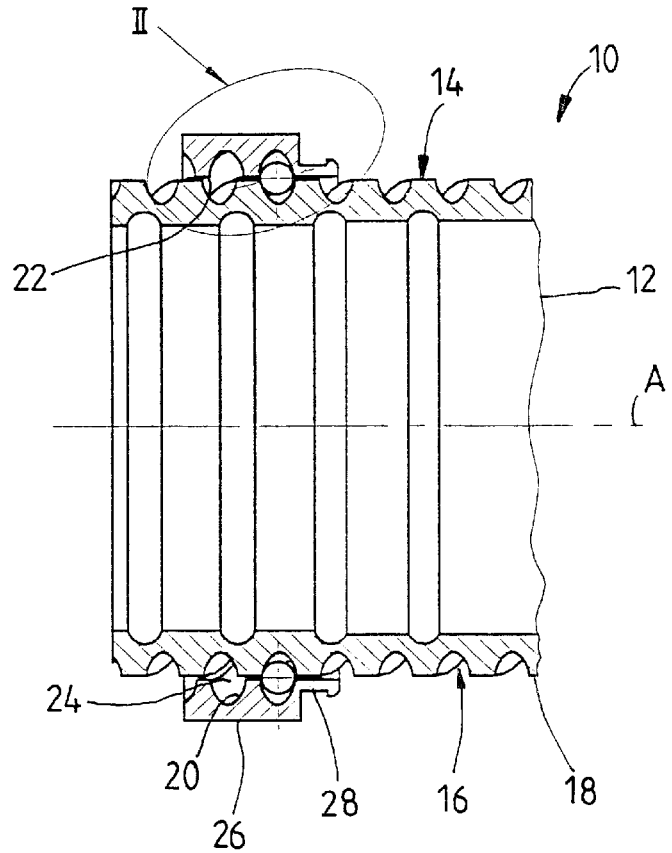
FIG. 1 is a partial longitudinal-sectional view of a ball screw according to the invention.

In FIG. 1, a ball screw according to the invention is designated in general by 10. The ball screw 10 comprises a spindle element 12 which is arranged or can be positioned for rotation about an axis of rotation A and which, for example, is not displaceable along the axis of rotation A. The sleeve-like spindle element 12 comprises, on its outer circumferential region or on its outer circumferential surface 14, a first groove arrangement 16 which may comprise, for example, a thread flight with a plurality of turns, this thread flight 18 having a predetermined lead, that is to say thread pitch.

A nut element 20 surrounds the spindle element 12 radially on the outside with a small radial interspace. The nut element 20 comprises, on its inside or inner circumferential surface 22, a second groove arrangement 24 which, for example, may again have a thread flight 26 with a lead or pitch which corresponds to the lead of the thread flight 18 of the first groove arrangement 16. On a circumferential region which cannot be seen in FIG. 1 there may be provided a ball return arrangement which connects the two end portions of the thread flight 26 to one another in such a way that the balls 28 arranged successively in the thread flight 26 can ultimately roll in the second groove arrangement 24 in the manner of a type of endless ball sequence.

Figure 4:
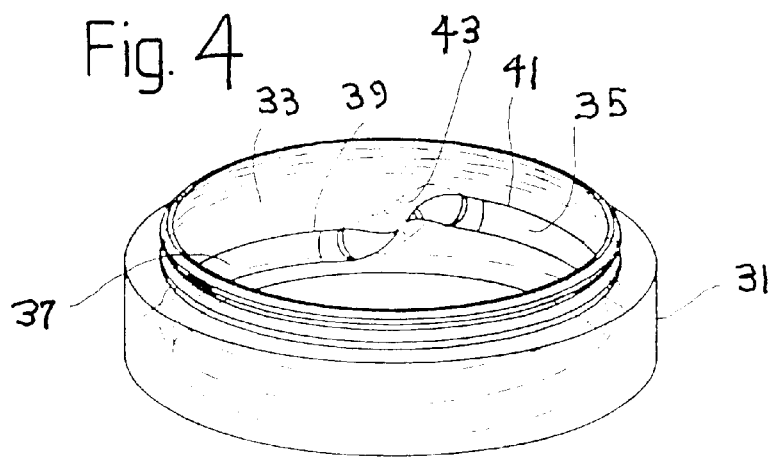
FIG. 4 is a perspective view of a nut element illustrating a ball return section therein.

FIG. 4 depicts another embodiment of a nut element 31 and shows the ball return arrangement. Nut element 31 has a second groove arrangement 35 on the nut element inner circumferential surface 33, the second groove arrangement in the depicted embodiment comprising a thread 37 with approximately a single turn, arranged so as to surround the spindle element 12 on the radially outer side. The two end regions 39, 41 of the thread 33 are connected to one another with a ball-return section 43 which leads radially away from the inner circumferential surface 33, so that ultimately it is possible to provide an endless series of balls 28 which are arranged following one another in the thread 37. The balls which are not in the ball-return section 43 then engage both in the first groove arrangement 16 and in the second groove arrangement 35 and can serve to a rotatable coupling between spindle element 12 and nut element 31.

It may be pointed out that the configuration illustrated is only one possible example of a ball screw. The most diverse configurations could be provided here, for example configurations with a plurality of thread flights on the first and the second groove arrangements 16, 24. Furthermore, it would be possible, for example, to provide on the nut element 20 strippers which engage into the first groove arrangement 16 and, during the relative movement between the spindle element 12 and nut element 20, ultimately ensure that the first groove arrangement 16 is cleaned. A stripper arrangement of this type could also be provided on the spindle element 12. It would be possible, moreover, to provide, between the individual balls arranged successively in the circumferential direction or in the longitudinal direction of the groove arrangements 16, 24, spacer elements which prevent the balls 28 from rubbing against one another. These spacer elements may be formed, for example, by balls with, for example, a smaller diameter, which are produced from material with high slidability, so that the balls 28 intended for load transmission and produced, for example, from metal cannot come directly into contact with one another.

Figure 2:
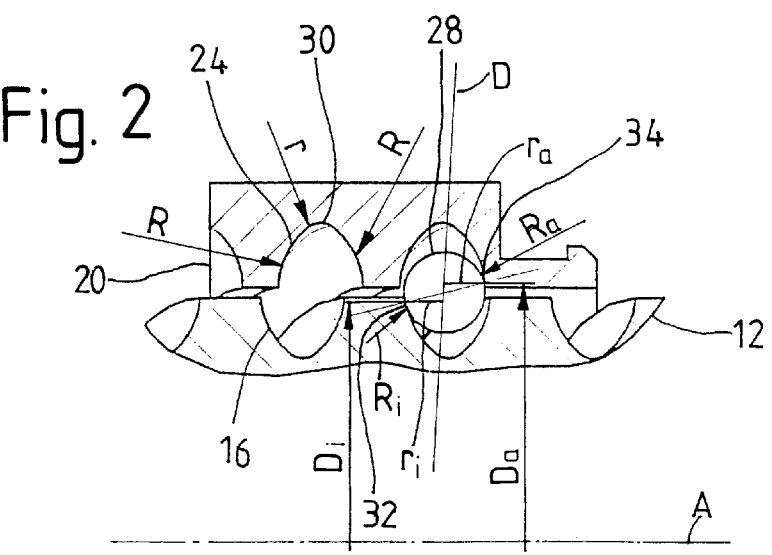
FIG. 2 is an enlarged sectional detail designated by II in FIG. 1.
Figure 3:
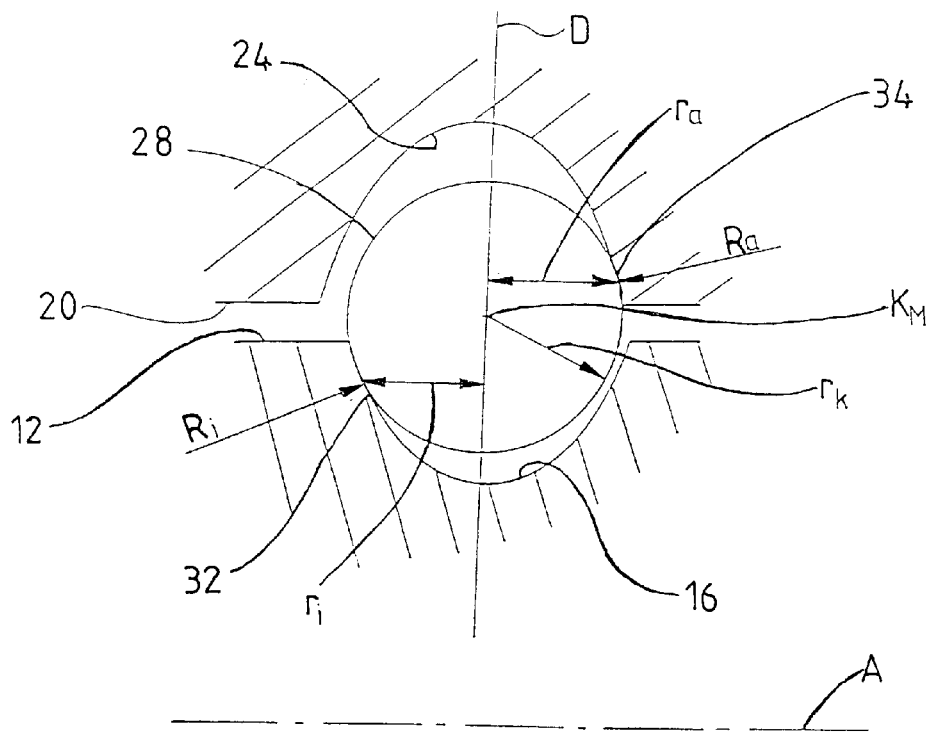
FIG. 3 shows an enlarged detail from FIG. 2, in which the configuration of the various groove cross-sectional profiles can be seen.

The cross-sectional profile, with respect to a longitudinal direction of the respective thread flights 18 and 26 or groove arrangements 16, 24, can be seen in FIGS. 2 and 3. It can be seen that, both in the first groove arrangement 16 and in the second groove arrangement 24, a cross-sectional profile of approximately oval or elliptic shape is provided, in which the radius of curvature R at the aperture region of the respective groove arrangements 16, 24 is larger than the radius of curvature r in the region of the groove bottom 30. In particular, this radius of curvature r is also smaller than the radius $r_k$ of the balls 28. The result of this is that the balls 28 cannot come into contact with the groove bottom 30 and therefore a chamber region is formed, in which dirt may settle without this leading to increased rolling resistance.

In FIG. 2, those surface regions of the first groove arrangement 16 and of the second groove arrangement 24 with which the balls 28 come into contact when conversion of movement is being carried out and therefore also under the action of load or force in the direction of the axis of rotation A are designated by 32 and 34 respectively. It can be seen that the rolling-surface region 32 on the spindle element 12 is at a shorter distance D, from the axis of rotation A than the rolling-surface region 34 with which the balls 28 are in contact on the nut element 20. When the nut element 20 rotates about the axis of rotation A with respect to the spindle element 12, then, owing to this bearing contact in the rolling-surface regions 32, 34, the axially clamped balls 28 rotate about respective ball axes of rotation D which are approximately orthogonal to the axis of rotation A or, in the illustration of FIG. 3, are slightly tilted counterclockwise about the ball center point $K_M$.

It can be seen, in FIG. 3, that the two groove arrangements 16 and 24 are designed with a cross-sectional profile such that the first surface radius of curvature $R_i$ of the cross-sectional profile of the first groove arrangement 16 in the associated first rolling-surface region 32 is smaller than the corresponding surface radius of curvature $R_a$ of the nut element 20 in the second rolling-surface region 34. The result of this is that the balls 28 contact the first rolling-surface region 32 of the spindle element 12 at a shorter distance $r_i$ from the ball axis of rotation D than the distance $r_a$ between the ball axis of rotation D and the contact with the second rolling-surface region 34. That is, the first effective ball rolling radius $r_i$ is smaller than the second effective ball rolling radius $r_a$. The result of this, too, is that the rolling movement in the first groove arrangement 16 is displaced somewhat further inward toward the groove bottom than will be the case as regards the second groove arrangement 24.

Thus, when the ball 28 of FIG. 3 rotates about its associated ball axis of rotation D, then, for example during a single revolution of the ball 28 about this ball axis of rotation D, the ball 28 will have executed a shorter rolling travel with its portion located radially further inward, to be precise a rolling travel which is in proportion to the effective rolling radius $r_i$, than is the case in the radially outer region, where the ball will roll on the second groove arrangement 24 with the larger effective rolling radius $r_a$. It is thereby possible to compensate for the fact that, during relative rotation between the nut element 20 and the spindle element 12 through a predetermined angle of rotation which, for example, could correspond again to a single ball revolution about the ball axis of rotation D, the ball 28 has to move somewhat further on the groove arrangement 24, located radially further outward, with respect to the axis of rotation A, than will be the case in the spindle element 12 located radially further inward. The ball 28 can thereby execute an essentially slip-free rolling movement both with respect to the nut element 20 and with respect to the spindle element 12.

In the ball screw 10 according to the invention, therefore, what is achieved by appropriate coordination of the cross-sectional profiles of the two groove arrangements 16, 24 is that, due to the different radii of curvature $R_1$ and $R_a$, there are different effective rolling radii $r_i$ and $r_a$ here, which are approximately in the same ratio to one another as the radial distances $D_1$ and $D_a$ of the rolling-surface regions 32 and 34 from the axis of rotation. Cross-sectional profiles of this type may be obtained, for example, by, commencing from the end region open radially outward or radially inward, the cross-sectional profiles are configured with a radius of curvature decreasing toward the groove bottom, and, in the case of the radially inner cross-sectional profile, that is to say the cross-sectional profile of the first groove arrangement 16, either a lower initial value is already used for the radius of curvature or the rate of change of the radius of curvature is greater than that in the case of the radially outer second groove arrangement 24.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We I claim:

1. A ball screw, comprising:

a spindle element having an outer circumferential surface with a first groove arrangement having a first rolling surface region;

a nut element surrounding the spindle element and being rotatable about an axis of rotation relative to said spindle element, said nut element having an inner circumferential surface with a second groove arrangement having a second rolling surface region; and a plurality of balls engaging in said first and second groove arrangements, said balls contacting said first and second groove arrangements at respective said first and second rolling surface regions, said balls being arranged to roll on said first and second rolling surface regions and to simultaneously rotate about respective ball axes of rotation as said nut is rotated relative to said spindle, each said ball having a first effective ball rolling radius between the respective ball axis of rotation and the first rolling surface region, and a second effective ball rolling radius between the respective ball axis of rotation and the second rolling surface region, each said first effective ball rolling radius being smaller than the respective said second effective ball rolling radius.

2. The ball screw according to claim 1, wherein the first groove arrangement has a groove cross-sectional profile with a first surface radius of curvature in the first-rolling surface region and the second groove arrangement has a cross-sectional profile with a second surface radius of curvature in the second rolling-surface region, said first surface radius of curvature being smaller than said second surface radius of curvature.

3. The ball screw according to claim 1, wherein the first groove arrangement and the second groove arrangement have a respective groove cross-sectional profile with a surface radius of curvature decreasing from a groove-aperture region to a groove bottom.

4. The ball screw according to claim 3, wherein the surface radius of curvature of the groove bottom of at least one of the first groove arrangement and the second groove arrangement is smaller than a radius of said balls.

5. The ball screw according to claim 1, wherein the first groove arrangement includes at least one thread flight with plural turns, said second groove arrangement having at least one second thread flight associated with said at least one first groove arrangement thread flight, said at least one second thread flight having at least one turn, including turn end regions, wherein said turn end regions are connected together with a ball return section.

6. The ball screw according to claim 3 wherein the groove cross-sectional profile of at least one of said first and second groove arrangements is at least substantially elliptical.

7. The ball screw according to claim 1 wherein said ball axes of rotation are at least substantially orthogonal to said axis of rotation of said nut element relative to said spindle element.

* * * * *